No. 846,034. PATENTED MAR. 5, 1907.
T. J. KIELEY & F. T. MUELLER.
GREASE EXTRACTOR.
APPLICATION FILED SEPT. 28, 1905.

Inventors
Timothy J. Kieley.
Frederick T. Mueller

By T. Walter Fowler,
their Attorney

Witnesses

UNITED STATES PATENT OFFICE.

TIMOTHY J. KIELEY AND FREDERICK T. MUELLER, OF NEW YORK, N. Y.

GREASE-EXTRACTOR.

No. 846,034.      Specification of Letters Patent.      Patented March 5, 1907.

Application filed September 28, 1905. Serial No. 280,431.

*To all whom it may concern:*

Be it known that we, TIMOTHY J. KIELEY and FREDERICK T. MUELLER, citizens of the United States, and residents of New York, borough of Manhattan, county of New York, and State of New York, have made and invented certain new and useful Improvements in Grease-Extractors, of which the following is a specification.

Our invention relates to a combined muffler and grease-extractor and feed-water heater, the object being to provide a device whereby the intermittent sound of exhaust-steam will be muffled, the grease, tarry, and flocculent matter extracted from the steam, and said steam condensed and the heat therefrom utilized for raising the temperature of feed-water, the device to be simple and economical to manufacture and effective in use.

With these and other ends in view the invention consists in certain novel features of construction and combinations of parts, as will be hereinafter fully described, and pointed out in the claim.

Figure 1:
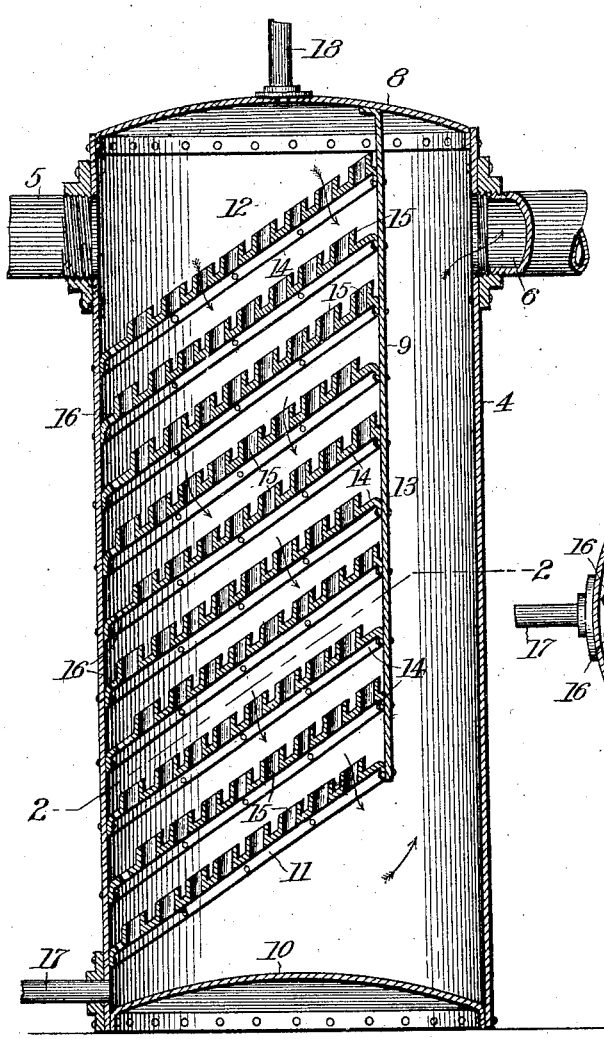
Figure 2:
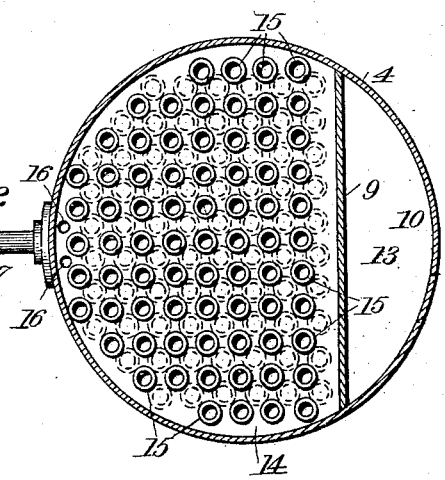

In the accompanying drawings, Figure 1 is a view, partly in section and partly in elevation, of our improved device. Fig. 2 is a sectional view of the tank 4 on the line 2 2 of Fig. 1.

Referring to the drawings, 4 represents a cylindrical tank, preferably made of metal and provided near its upper end with the inlet-pipe 5, leading from a steam-exhaust, an outlet-pipe 6, leading from said tank 4. From the top 8 of the tank 4 extends the division-plate 9 within a short distance of the bottom 10, the lower end of said plate 9 being secured to the inclined diaphragm 11, thereby dividing said tank 4 into two compartments—namely, the compartment 12, containing the muffling and grease-extracting devices, and the compartment 13, containing the cleansed steam, from which latter compartment the steam escapes or flows to the feed-water heater.

In the compartment 12 are located a series of inclined plates or diaphragms 14, the edges of which are secured to the cylinder 4 and division-plate 9, said plates or diaphragms being perforated and provided with the flanges 15 around said openings, said openings in the several plates being staggered, as illustrated in Figs. 1 and 3 of the drawings, in order that the steam may be caused to take a zigzag course in passing through the same.

By inclining the plates or diaphragms 14 the grease, tarry, flocculent, or other matter extracted from the steam will flow by gravity, assisted by the force of the exhaust-steam, toward the lowermost edges of said plates through the openings 16, in which it will flow to the bottom of the tank and out through the outlet-pipe 17, the flanges or tubes 15 affording additional impinging surface for the steam and assisting in the extraction of the oil therefrom. Should any foreign matter extracted from the steam collect on the diaphragms or in the bottom of the tank, and which the low pressure of the exhaust-steam be incapable of removing, we force the same out through the exhaust-pipe 17 by means of live steam admitted to the tank through a pipe 18, leading into the upper end of the tank, as illustrated in Fig. 1. As shown in practice and by many severe tests to which the device has been subjected, the sound of the exhaust-steam when passing through this tank is completely muffled, and analysis of the condensed steam shows that the water is clear and free from oil, tarry, and flocculent matter and contains but a very slight residue. The steam after passing through the diaphragms 14 11 passes into the chamber or compartment 13, from which it flows through the pipe 6.

Having fully described our invention, what we claim as new, and desire to secure by Letters Patent, is—

In a device of the character described, the combination with a tank provided near its upper end with inlet and outlet ports for exhaust-steam, and at its lower end with an outlet-pipe for matters extracted from said exhaust-steam, of a division-plate secured at its upper end to the top of the tank and at its lower end to a slanting perforated plate dividing said tank into two compartments, and a series of slanting perforated plates secured to said tank and division-plate, said perforated plates being arranged in vertical series and all slanting in the same direction, the perforations in said slanting plates being surrounded by upwardly-extending flanges, and each of said slanting plates having an opening through it at its lowest point and proximate to the wall of the tank whereby the separated grease will be delivered from one plate to another and finally will be delivered beneath the lowermost plate in the vicinity of the final outlet, substantially as described.

Signed at New York, borough of Manhattan, county of New York, and State of New York, this 11th day of September, A. D. 1905.

TIMOTHY J. KIELEY.
FREDERICK T. MUELLER.

Witnesses:
M. VAN NORTWICK,
N. B. SMITH.